United States Patent
Cha et al.

(10) Patent No.: US 11,379,013 B2
(45) Date of Patent: Jul. 5, 2022

(54) ELECTRONIC DEVICE

(71) Applicant: LG ELECTRONICS INC., Seoul (KR)

(72) Inventors: Youngdo Cha, Seoul (KR); EuJin Kim, Seoul (KR); Jungyun Lee, Seoul (KR); Junhong Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 16/944,604

(22) Filed: Jul. 31, 2020

(65) Prior Publication Data
US 2021/0365073 A1 Nov. 25, 2021

(30) Foreign Application Priority Data
May 19, 2020 (WO) ................ PCT/KR2020/006557

(51) Int. Cl.
*G06F 1/16* (2006.01)
(52) U.S. Cl.
CPC .......... *G06F 1/1681* (2013.01); *G06F 1/1626* (2013.01); *G06F 1/1652* (2013.01)
(58) Field of Classification Search
CPC combination set(s) only.
See application file for complete search history.

(56) References Cited

U.S. PATENT DOCUMENTS

| | | | |
|---|---|---|---|
| 9,848,502 B1 | 12/2017 | Chu et al. | |
| 10,423,019 B1 | 9/2019 | Song | |
| 10,824,197 B1* | 11/2020 | Hsu | G06F 1/1616 |
| 10,845,850 B1* | 11/2020 | Kang | H04M 1/022 |
| 11,048,296 B2* | 6/2021 | Hsu | G06F 1/1616 |
| 2020/0371584 A1 | 11/2020 | Kim et al. | |
| 2021/0034116 A1* | 2/2021 | Torres | G06F 1/1616 |
| 2021/0034117 A1* | 2/2021 | Torres | G09F 9/301 |
| 2021/0041921 A1* | 2/2021 | Kang | E05D 3/122 |
| 2021/0165466 A1* | 6/2021 | Kang | E05D 3/18 |
| 2021/0181808 A1* | 6/2021 | Liao | G06F 1/1616 |
| 2021/0271294 A1* | 9/2021 | Liao | G06F 1/1652 |

FOREIGN PATENT DOCUMENTS

| | | |
|---|---|---|
| EP | 3 477 422 A1 | 5/2019 |
| KR | 10-2019-0048384 A | 5/2019 |
| KR | 10-2019-0062107 A | 6/2019 |
| KR | 10-2020-0028844 A | 3/2020 |
| KR | 10-2085235 B1 | 3/2020 |

* cited by examiner

*Primary Examiner* — Lisa Lea-Edmonds
(74) *Attorney, Agent, or Firm* — Birch, Stewart, Kolasch & Birch, LLP

(57) ABSTRACT

An electronic device including a flexible display having a first region and a second region; a first frame supporting the first region and rotatable about a first axis; a second frame supporting the second region and rotatable about a second axis different than the first axis; and a hinge module connecting the first frame and the second frame and including a gear mechanism so the first frame rotatable about the first axis and the second frame rotatable about the second axis rotate in conjunction and synchronization with each other when the electronic device is folded and unfolded.

19 Claims, 24 Drawing Sheets

ELECTRONIC DEVICE

CROSS-REFERENCE TO RELATED APPLICATION

Pursuant to 35 U.S.C. § 119, this application claims the benefit of earlier filing date and right of priority to International Application No. PCT/KR2020/006557 filed on May 19, 2020, the contents of which are all hereby incorporated by reference herein in its entirety.

BACKGROUND OF THE INVENTION

1. Field of the Invention

The present disclosure relates to an electronic device.

2. Discussion of the Related Art

With the recent development of digital technologies, various types of electronic device, such as mobile communication terminals, smart phones, tablet personal computers (PC), notebooks, personal digital assistants (PDA), wearable devices, and digital cameras, have been widely used. As performance of the electronic devices has improved, the demand for a large-area display capable of providing various functions more efficiently is increasing. Also, there is a need to minimize an electronic device with a relatively thinner thickness, which contradicts with an electronic device having a large area display.

Accordingly, researches and studies are being conducted on an electronic device with a flexible display (e.g., a foldable display, a rollable display, and the like) which is sufficiently elastic so that at least a portion of the display can be folded or rolled and then unfolded and unrolled as necessary.

SUMMARY OF THE INVENTION

When an electronic device includes a foldable-type flexible display, a portion of which is capable of being folded and unfolded, there may be a difference between an inner side and an outer side of the folded portion due to a thickness of the electronic device.

In particular, since a display tends to have a large area and an electronic device tends to be manufactured in a large size, the use of a typical single-axle hinge may not be enough to fold or unfold the electronic device smoothly while supporting a weight of the electronic device.

According to an aspect, there is provided an electronic device, including a flexible display having a first region and a second region, a first frame supporting the first region and rotatable about a first axis, a second frame supporting the second region and rotatable about a second axis, and a hinge module connecting the first frame and the second frame so that the first frame and the second frame are synchronously foldable.

For example, the hinge module may include a slot body fixed to either the first frame or the second frame, and a gear body connected to the slot body to be rotatable integrally with the slot body and guiding a linearly moving direction of the slot body.

For example, the hinge module may include a first hinge module disposed on one side of the electronic device, a second hinge module spaced apart from the first hinge module in an axial direction, and a synchronization module configured to link the first hinge module and the second hinge module.

For example, the synchronization module may include a first connection arm connected to a gear body of the first hinge module, a second connection arm connected to a gear body of the second hinge module and a cam gear coupled between the first connection arm and the second connection arm.

For example, the first connection arm and the second connection arm may linearly move in directions toward or away from the cam gear in response to a rotation of at least one of the first hinge module or the second hinge module, and the cam gear may rotate in response to linear movement of at least one of the first connection arm and the second connection arm.

For example, the hinge module may include a first main gear rotating about the first axis in response to rotation of the first frame, a second main gear rotating about the second axis in response to rotation of the second frame, and auxiliary gears arranged between the first main gear and the second main gear and rotating in engagement with the first main gear and the second main gear.

For example, the first main gear may rotate about the first axis in response to the rotation of the first frame or the rotation of the second frame, and the second main gear may rotate around the second axis in response to the rotation of the first frame or the rotation of the second frame.

When rotating, the first frame may linearly move in a direction toward or away from the second frame.

For example, the hinge module may further include a connection pin connecting the slot body and the gear body, and the connection pin may be fixed to one side of the gear body and guide a linearly moving direction of the slot body based on a shape of a slot provided in the slot body.

For example, both ends of the slot of the slot body may have a depth deeper than a depth of a central portion thereof. When rotating, the slot body may slide with respect to the gear body in a direction toward or away from the gear body.

For example, the hinge module may further include a first hinge structure for guiding a direction of rotation of the slot body.

For example, the hinge module may further include a support bracket that connects a gear body of the first hinge module and a gear body of the second hinge module.

For example, the first connection arm and the second connection arm may include gear teeth at one ends thereof connected to the gear bodies, and, in response to rotation of at least one gear body connected to the first connection arm or the second connection arm, the first connection arm and the second connection arm may move linearly in directions toward or away from the cam gear.

For example, the gear bodies respectively connected to the first connection arm and the second connection arm may have gear teeth corresponding to gear teeth of the first connection arm and gear teeth of the second connection arm, and the gear teeth of the gear bodies may engage with the gear teeth of the first connection arm and the gear teeth of the second connection arm at a preset angle in response to rotation of at least one of the first frame or the second frame.

According to another aspect, there is provided a folding device, including a first frame disposed to be rotatable about a first axis, a second frame disposed to be rotatable about a second axis spaced apart from the first axis, and a hinge module connecting the first frame and the second frame so that the first frame and the second frame rotate in conjunction with each other.

For example, the hinge module may include a first hinge module disposed on one side of the folding device, and a second hinge module spaced apart from the first hinge module. The first hinge module and the second hinge module may be connected to each other through a connection arm.

For example, in response to rotation of one of the first hinge module and the second hinge module, the connection arm may cause the other one of the first hinge module and the second hinge module to rotate.

For example, the hinge module may include a gear set configured to, in response to rotation of one of the first frame and the second frame, cause the other one of the first frame and the second frame to rotate.

For example, each of the first hinge module and the second hinge module may include an upper slot body fixed to the first frame and an upper gear body connected to the upper slot body, and a lower slot body fixed to the second frame and a lower gear body connected to the lower slot body. The connection arm may be connected to each of the upper gear body and the lower gear body.

For example, the connection arm may linearly move in response to rotation of any one of the upper gear body and the lower gear body.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION OF THE EMBODIMENTS

Figure 1:
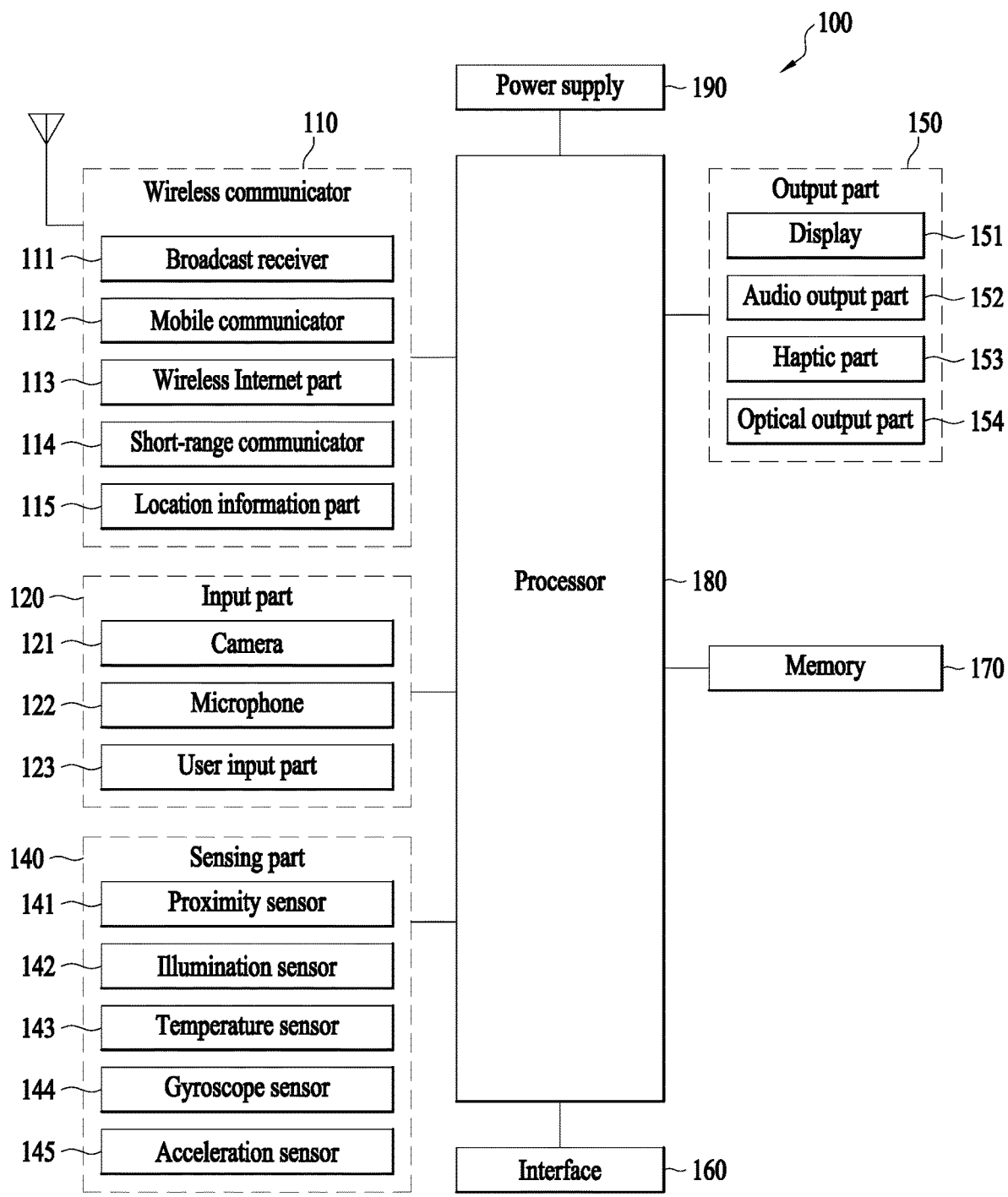
FIG. 1 is a block diagram illustrating an electronic device according to various embodiments of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

An electronic device according to various embodiments may include at least one of a mobile phone, a smartphone, a laptop computer, a digital broadcasting terminal, personal digital assistants (PDA), a portable multimedia player (PMP), a navigator, a slate PC, a tablet PC, an ultrabook, a wearable device (e.g., smartwatch), a smart glass, a head-mounted display (HMD), a digital TV, a desktop computer, or a digital signage.

FIG. 1 is a block diagram illustrating an electronic apparatus according to example embodiments of the present disclosure. Referring to FIG. 1, an electronic apparatus 100 may include at least one of a wireless communicator 110, an input part 120, a sensing part 140, an output part 150, an interface 160, a memory 170, a controller 180, and a power supply 190. The electronic apparatus 100 may include other components in addition to the components of FIG. 1 and may also include some of the components of FIG. 1.

The wireless communicator 110 may include at least one module that enables wireless communication to be performed between the electronic apparatus 100 and a wireless communication system, between the electronic apparatus 100 and another electronic apparatus (not shown) (e.g., the electronic apparatus 100), or between the electronic apparatus 100 and an external server. The wireless communicator 110 may include one or more modules that connect the electronic apparatus 100 to one or more networks. The wireless communicator 110 may include at least one of a broadcast receiver 111, a mobile communicator 112, a wireless Internet part 113, a short-range communicator (e.g., near-field communication (NFC)) 114, and a location information part 115.

The input part 120 may include at least one of an image input part (for example, a camera 121) that receives an image signal input, an audio input part (for example, a microphone 122) that receives an audio signal input, or a user input part 123 that receives a user input. For example, the user input part 123 may receive a user touch input through a touch sensor (or touch panel) provided in a display 151 or receive a user input through a mechanical key. Information collected in the input part 120 (for example, voice data and image data) may be analyzed and processed as a control command of a user.

The sensing part 140 may include one or more sensors to sense at least one of information in the electronic apparatus 100, surrounding environment information of the electronic apparatus 100, or user information. For example, the sensing part 140 may include at least one of a proximity sensor 141, an illumination sensor 142, a temperature sensor 143, a gyroscope sensor 144, and an acceleration sensor 145. In addition, the sensing part 140 may include a touch sensor, a finger scan sensor, a magnetic sensor, a gravity (G)-sensor, a motion sensor, an RGB sensor, an infrared (IR) sensor, an ultrasonic sensor, an optical sensor, a battery gauge, an environment sensor (for example, a barometer, a hygrometer, a thermometer, a radioactivity sensor, a heat sensor, and a gas detection sensor), or a chemical sensor (for example, an electronic nose, a healthcare sensor, and a biometric sensor). In the present disclosure, the electronic apparatus 100 may use a combination of pieces of information sensed in at least two sensors among the aforementioned sensors.

The output part 150 may output information related to visual, auditory, or tactile. For example, the output part 150 may include at least one of the display 151, an acoustic (audio) output part 152, a haptic part 153, or an optical output part 154.

The display 151 may form a layer structure with a touch sensor or be integrally formed with the touch sensor, thereby implementing a touch screen that provides a touch input function and a screen display function simultaneously. For example, the touch screen may function not only as the user input part 123 that provides an input interface between the electronic apparatus 100 and a user but also as the output part 150 that provides an output interface between the electronic apparatus 100 and the user.

Meanwhile, the electronic device 100 according to various embodiments of the present disclosure may include a display 151 for outputting the image information, the display 151 which is a flexible type to be rollable, bendable, or foldable. For example, the flexible display may be formed on a thin flexible board that can be bent, folded, twisted, or curled like paper while having characteristics identical or similar to those of a typical flat-type display.

For example, the flexible display may be combined with a touch sensor to implement a flexible touch screen. Also, the controller may detect a touch input through a touch screen of the display and may perform various functions corresponding to the touch input.

The electronic device 100 may further include a deformation detector for detecting a change in shape of the flexible display. For example, the electronic device 100 can detect a change in shape of the flexible display through at least one element of the sensing part 140. In addition, based on a change in shape of the flexible display, which is detected by at least one of the deformation detector or the sensing part 140, the controller 180 can change information displayed on the flexible display or may generate a predetermined control signal.

Further, a change in shape of the flexible display may include a change in area of a flexible display region which is visible through the first side (e.g., a front surface) of the electronic device, and through which an image is output to an outside in the first direction. As a portion of the flexible display is rolled, folded, or bent, an image output region of the flexible display, which faces the first direction, may increase or decrease in area.

A change in shape of the flexible display described above may occur based on an external force applied by the user, but not limited thereto. Also, the electronic device 100 (e.g., the controller 180) can automatically change a shape of the flexible display based on an input received through the input part 120 or the sensing part 140 or based on a predetermined application command.

The audio output part 152 can externally output audio data stored in the memory 170 or received from the wireless communicator 110 in a call signal reception, a call mode or a recording mode, a voice recognition mode, a broadcast reception mode, or the like. The audio output part 152 may output an acoustic signal associated with a function (for example, a call signal reception sound and a message reception sound) performed in the electronic apparatus 100. For example, the audio output part 152 may include at least one of a receiver, a speaker, or a buzzer.

The haptic part 153 can generate various tactile effects to be experienced by a user. A vibration is a representative example of the tactile effects generated by the haptic part 153. An intensity and a pattern of the vibration generated by the haptic part 153 can be determined based on a selection of a user or setting of the controller 180. In addition, the haptic part 153 can output a combination of different vibrations or output different vibrations in sequence.

The optical output part 154 can output a signal to announce an event occurrence using light of a light source of the electronic apparatus 100. For example, an event occurring in the electronic apparatus 100 may include at least one of message reception, call signal reception, missed call, alarm, schedule notification, e-mail reception, and application-based information reception.

In addition, the interface 160 functions as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform a control or a function associated with the connected external device.

The memory 170 can store data related to various functions of the electronic apparatus 100. For example, the memory 170 may store application programs (or applications) run in the electronic apparatus 100, data for operation of the electronic apparatus 100, and instructions. As an example, at least a portion of the application programs may be downloaded from an external server through wireless communication. As another example, at least a portion of the application programs may be previously stored in the memory 170 for a function (for example, call forwarding and outgoing function and message receiving and outgoing function) of the electronic apparatus 100. The application program stored in the memory 170 may be run to perform a predetermined operation (or function) of the electronic apparatus 100 based on the controller 180.

The controller 180 (e.g., processor) controls an overall operation of the electronic apparatus 100. For example, the controller 180 can process a signal, data, information, and the like input or output through components of the electronic apparatus 100 or run the application program stored in the memory 170, thereby providing information to a user or performing a predetermined function.

For example, to run the application program stored in the memory 170, the controller 180 can control at least a portion of the components of the electronic apparatus 100 of FIG. 1. To run the application program, the controller 180 can operate a combination of two or more components among the components included in the electronic apparatus 100.

In addition, the power supply 190 can supply power to each component included in the electronic apparatus 100 by receiving external or internal power based on a control of the controller 180. The power supply 190 may include a battery. The battery may include a built-in battery or a removable battery.

At least a portion of the aforementioned components of the electronic apparatus 100 may operate in cooperation with each other to implement an operation, a control, or a control method of the electronic apparatus 100 according to various embodiments as described below. Also, the operation, control, or control method of the electronic apparatus 100 may be embodied by running at least one application program stored in the memory 170.

The electronic apparatus 100 and the display 151 may be in a bar shape. However, embodiments are not limited thereto. The electronic apparatus 100 may have various shapes within the scope of not contradicting features of the present disclosure.

Figure 2A:
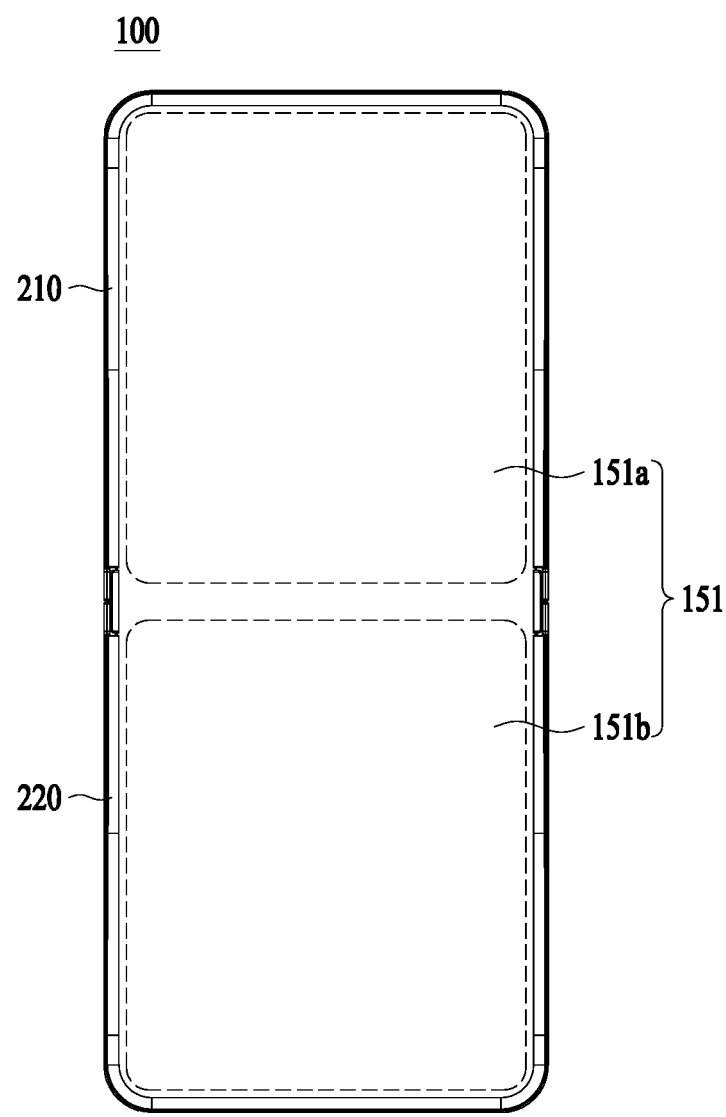
FIG. 2A is a front view of an electronic device in an unfolded state according to an embodiment of the present disclosure.
Figure 2B:
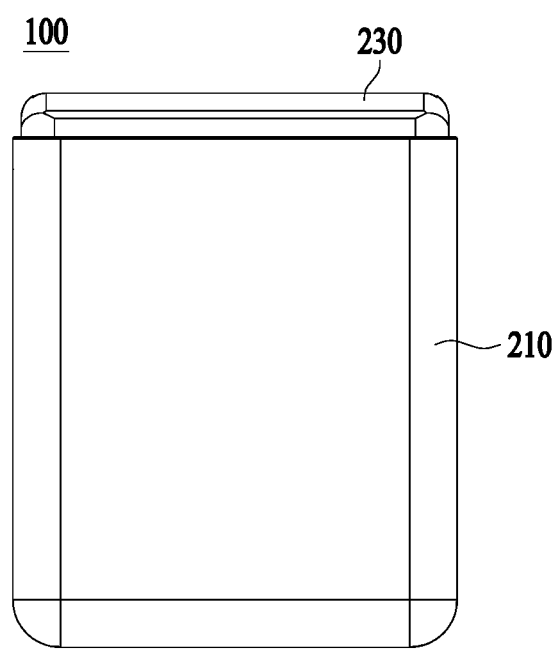
FIG. 2B is a front view of the electronic device in a folded state according to an embodiment of the present disclosure.
Figure 2C:
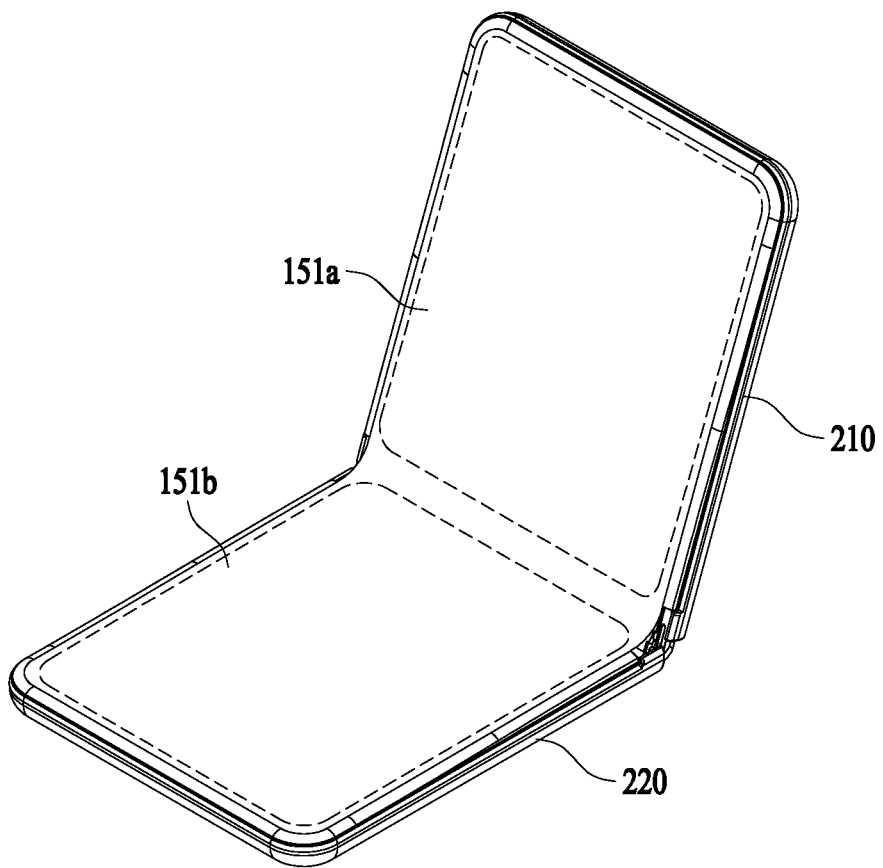
FIGS. 2C and 2D are perspective views of an electronic device in a partially folded state according to an embodiment of the present disclosure.
Figure 2D:
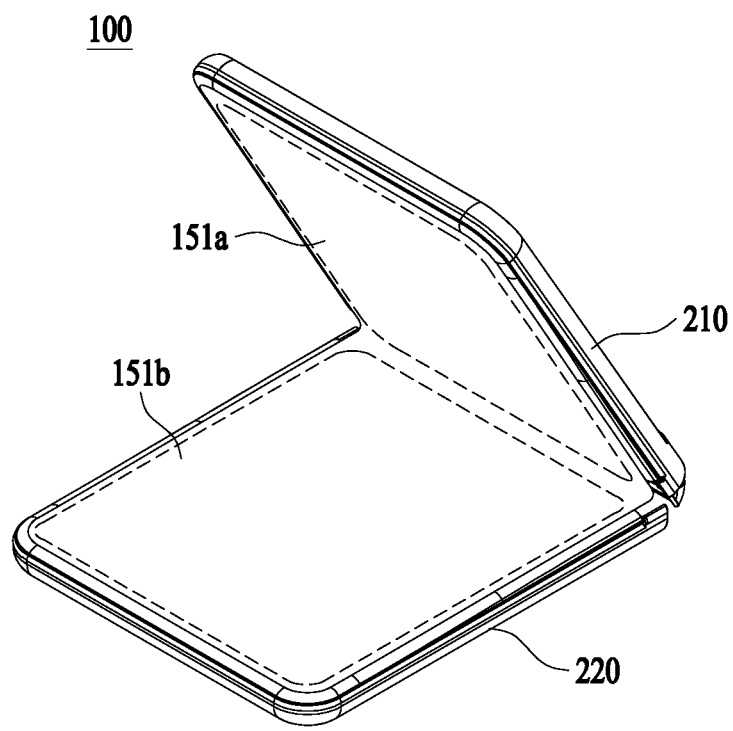

Next, FIG. 2A is a front view of an electronic device in an unfolded state according to an embodiment of the present disclosure, FIG. 2B is a front view of the electronic device in a folded state according to an embodiment of the present disclosure, and FIGS. 2C and 2D are perspective views of an electronic device in a partially folded state according to an embodiment of the present disclosure.

Referring to FIGS. 2A to 2D, the electronic device 100 according to various embodiments may have a foldable structure that can be folded or unfolded about one region. For example, the electronic device 100 may include a flexible type display 151 that includes a first region 151*a* and a second region 151*b*. The first region 151*a* may be supported by a first frame 210, and the second region 151*b* may be supported by a second frame 220. The first frame 210 and the second frame 220 can rotate in directions toward or away from each other by a hinge module 300 (see FIG. 3) to be described later. Accordingly, a positional relationship between 151*a* and the second region 151*b* can change.

When the electronic device 100 is fully unfolded as shown in FIG. 2A, the first region 151*a* and the second region 151*b* are substantially arranged on the same plane to output image information in one direction. In addition, when the electronic device 100 is fully folded as shown in FIG. 2B, the first region 151*a* and the second region 151*b* are arranged to face each other, thereby not visible from an outside.

In addition, the electronic device 100 according to an embodiment may have a free-stop function to maintain an angle by which the electronic device 100 is currently folded or unfolded. As shown in FIG. 2C, when the electronic device 100 is folded at a particular angle such that the first region 151*a* and the second region 151*b* of the display 151 form an obtuse angle, the electronic device 100 can maintain the particular angle unless an additional external force or a user input is applied, and the electronic device 100 can output image information through the first region 151*a* and the second region 151*b*. In addition, as shown in FIG. 2D, when the electronic device 100 is folded such that the first region 151*a* and the second region 151*b* form an acute angle, the electronic device 100 can maintain the folding angle.

According to various embodiments, the electronic device 100 may further include a third frame 230. When the electronic device 100 is fully unfolded (e.g., FIG. 2A), the third frame 230 can be completely hidden by the first frame 210 and the second frame 220, thereby not being visible from the outside. According to folding of the electronic device 100, the third frame 230 may be gradually visible from the outside. When the electronic device 100 is fully folded as illustrated in FIG. 2B, the third frame 230 can be completely visible from the outside and constitute a side surface of the electronic device 100, the side surface which corresponds to a folding axis between the first frame 210 and the second frame 220.

According to various embodiments, the display 151 may include a third region between the first region 151*a* and the second region 151*b*. The third region, which is a region continuously connected to the first region 151*a* and the second region 151*b*, can output image information or receive (detect) a touch input so as do the first region 151*a* and the second region 151*b*.

Figure 3:
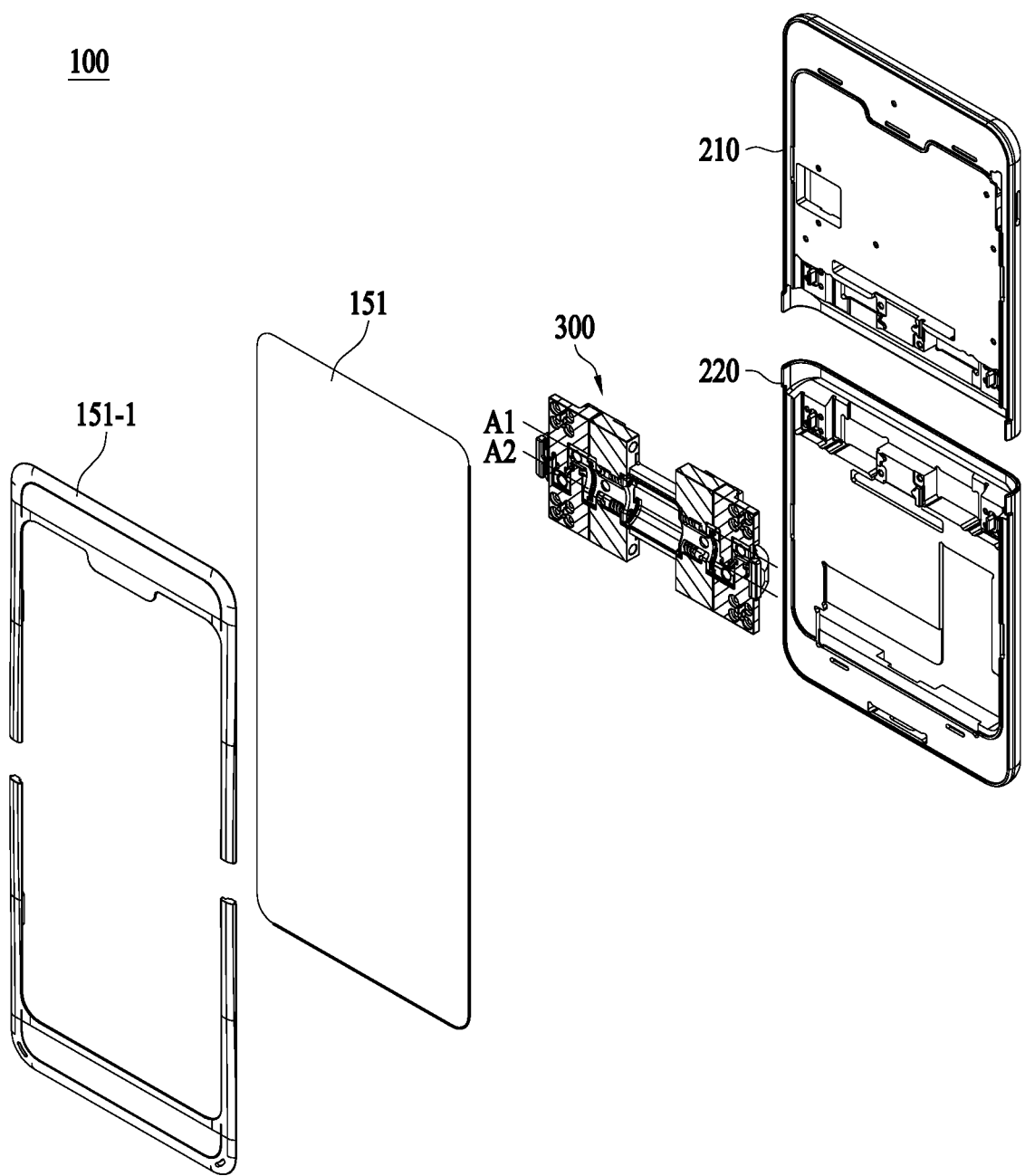
FIG. 3 is a schematic exploded perspective view of an electronic device according to an embodiment of the present disclosure.

Next, FIG. 3 is a schematic exploded perspective view of an electronic device 100 according to an embodiment of the present disclosure. Referring to FIG. 3, an electronic device 100 according to various embodiments of the present disclosure may include a flexible display 151, a first frame 210 supporting a portion of the display 151, a second frame 220 supporting another portion of the display 151, and a hinge module 300 for controlling rotation of the first frame 210 and the second frame 220.

The first frame 210 and the second frame 220 are connected to the hinge module 300, and the display 151 is seated on the first frame 210 and the second frame 220. According to an embodiment, the electronic device 100 may further include a deco frame 151-1 disposed on the display 151. In particular, the deco frame 151-1, which is divided to correspond to the first frame 210 and the second frame 220, covers an outer peripheral portion of the display 151. The deco frame 151-1 is not a required component for the present disclosure and can be selectively provided in the electronic device 100. The deco frame 151 can also have a different shape from a shape shown in FIG. 3.

According to various embodiments, the first frame 210 is rotatable about a first axis A1, and the second frame 220 is rotatable about a second axis A2 spaced apart from the first axis A1. In addition, the first axis A1 and the second axis A2 can refer to virtual axes spaced apart from each other in parallel.

The electronic device 100 according to various embodiments of the present disclosure includes the hinge module 300 having a gear structure (e.g., a gear set 430 in FIG. 8), by which the first frame 210 rotatable about the first axis A1 and the second frame 220 rotatable about the second axis A2 are enabled to rotate in conjunction and synchronization with each other when the electronic device 100 is folded.

Figure 4:
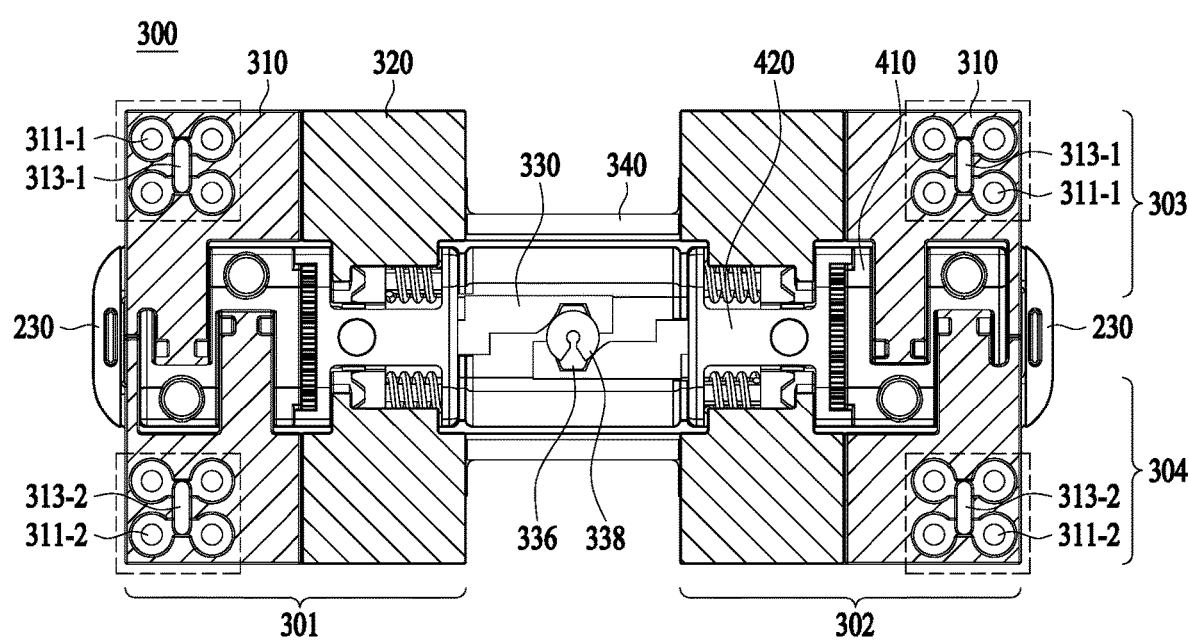
FIG. 4 is a front view of a hinge module according to various embodiments of the present disclosure.

In addition, as shown in FIG. 4, the hinge module 300 may include a first hinge module 301 and a second hinge module 302 provided on a left side and a right side thereof, respectively. Here, the first hinge module 301 and the second hinge module 302 may have a structure connected to each other (e.g., a connection arm 330 and a support bracket 340 in FIG. 4) to link and synchronize rotation of the first hinge module 301 and rotation of the second hinge module 302.

Figure 5A:
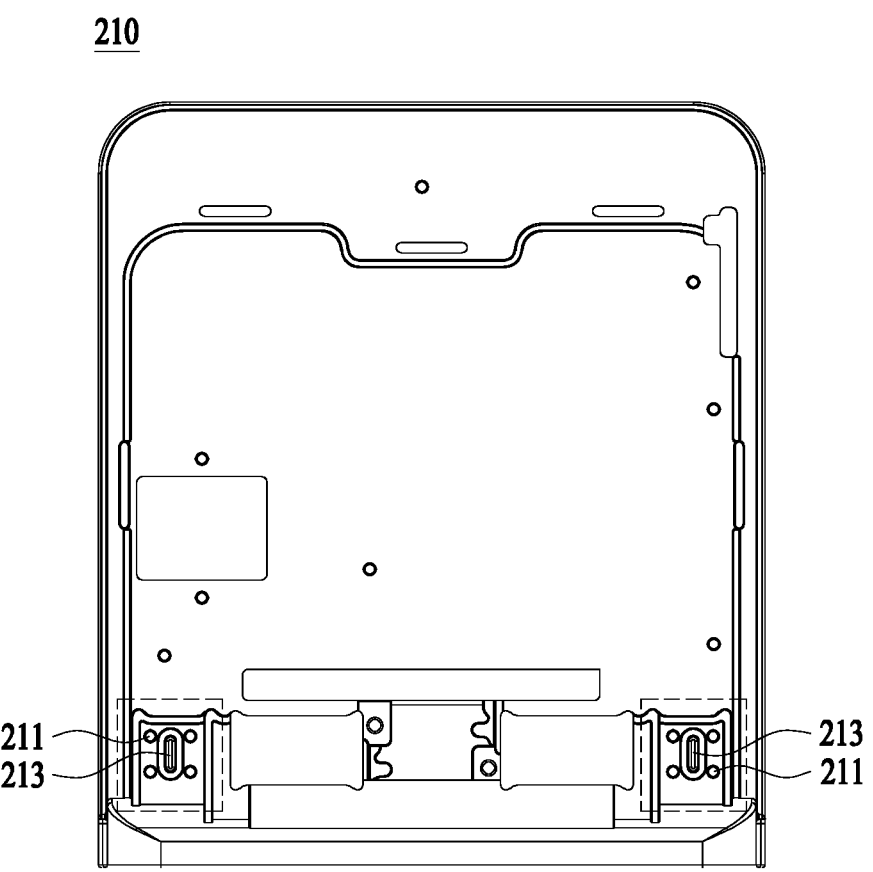
FIG. 5A is a front view of a first frame according to an embodiment of the present disclosure.
Figure 5B:
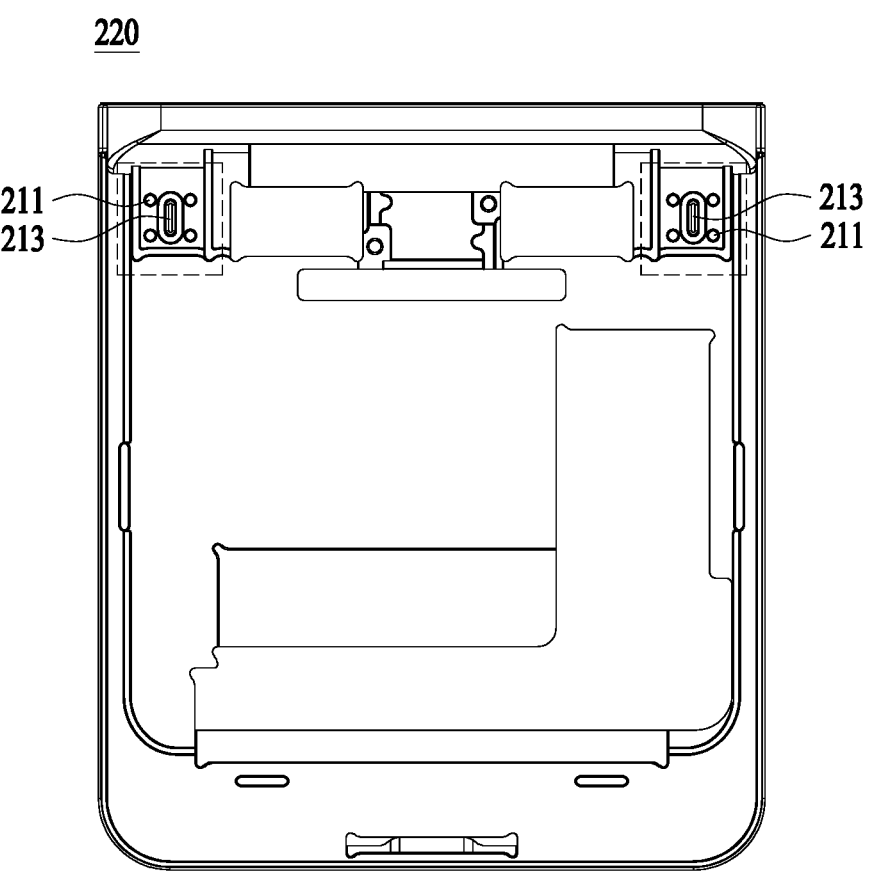
FIG. 5B is a front view of a second frame according to an embodiment of the present disclosure.

In more detail, FIG. 4 is a front view of the hinge module 300 according to various embodiments of the present disclosure, FIG. 5A is a front view of the first frame 210 according to an embodiment of the present disclosure, and FIG. 5B is a front view of the second frame 220 according to an embodiment of the present disclosure. Referring to FIG. 4, the hinge module 300 according to various embodiments may include a slot body 310, a gear body 320, a connection arm 330, a support bracket 340, a first hinge structure 410, and a second hinge structure 420.

The slot body 310 can be connected to either the first frame 210 or the second frame 220 and rotate along with the first frame 210 and the second frame 220 according to folding or unfolding of the electronic device 100. Referring to FIGS. 5A and 5B, the slot body 310 of the electronic device 100 according to an embodiment may include one or more screw holes 311-1 and 311-2 to be connected (or engaged) with either the first frame 210 or the second frame 220.

In addition, an upper part 303 of the hinge module 300 can rotate about the first axis A1 (see FIG. 3) and a slot body 310 of the upper part 303 of the hinge module 303 includes first screw holes 311-1 located at positions corresponding to screw holes 211 (see FIG. 5A) provided in the first frame 210 of the electronic device 100. Thus, the first frame 210 and the slot body 310 of the upper part 303 of the hinge module 300 can be screw-coupled at the positions of the screw holes 211 and 311-1 to be fixed to each other. In addition, a lower part 304 of the hinge module 300 can rotate about the second axis A2 (see FIG. 3), and a slot body 310 of the lower part 304 of the hinge module 300 includes second screw holes 311-2 located at positions corresponding to screw holes 221 (see FIG. 5) provided in the second frame 220 of the electronic device 100. Thus, the second frame 220 and the slot body 310 of the lower part 304 of the hinge module 300 can be screw-coupled at the positions of the screw holes 221 and 311-2 to be fixed to each other.

The first frame 210 and the second frame 220 may further include protruding patterns 213 to guide positions to be screw-coupled with the slot body 310. In addition, the slot body 310 may include coupling holes 313-1 and 313-2 corresponding to the protruding patterns 213 and 223, the coupling holes 313-1 and 313-2 into which the protruding patterns 213 can be inserted. For example, the protruding patterns 213 and the coupling holes 313-1 and 313-2 can have shapes that can be mechanically coupled to (engaged with) each other.

Figure 6A:
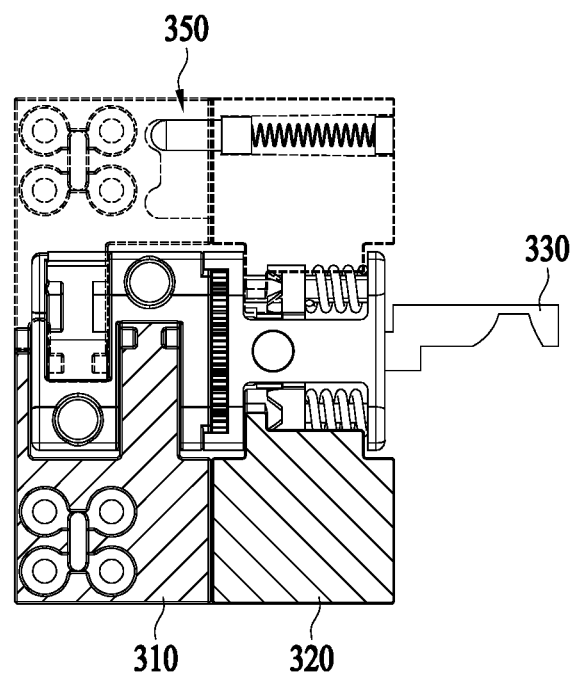
FIG. 6A is a schematic diagram illustrating a position of a connection part of a hinge module of another electronic device according to an embodiment of the present disclosure.

In FIG. 4, four screw holes 311-1 and 311-2 of the electronic device 100 according to an embodiment are provided at corners of each slot body 310. However, the number and shape of the screw holes 311-1 and 311-2 of the electronic device 100 are not limited thereto. According to various embodiments, at least one slot body 310 provided in the hinge module 300 can be connected to the gear body 320 through a connection part 350 (FIG. 6A). Hereinafter, a connected relationship between the slot body 310 and the gear body 320 and rotation of the hinge module 300 will be described with reference to FIGS. 6A to 6F.

Figure 6B:
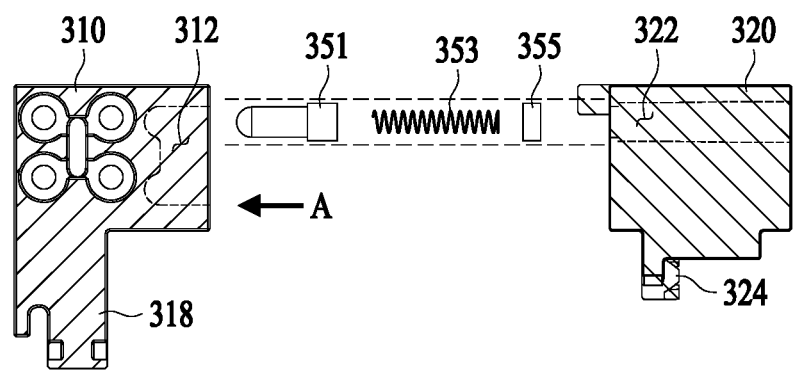
FIG. 6B is a schematic exploded view of a hinge module according to an embodiment of the present disclosure.
Figure 6C:
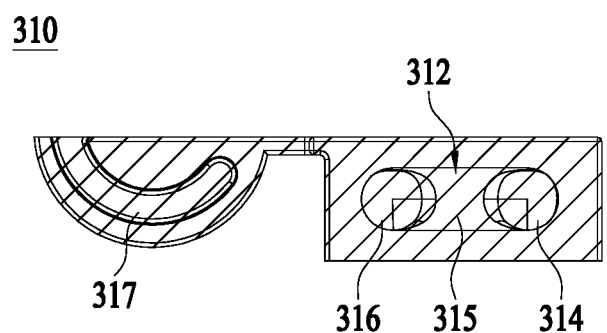
FIGS. 6C and 6D are side views of a slot body according to various embodiments of the present disclosure.
Figure 6D:
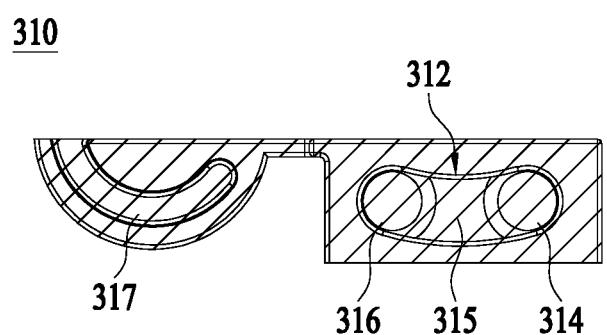
Figure 6E:
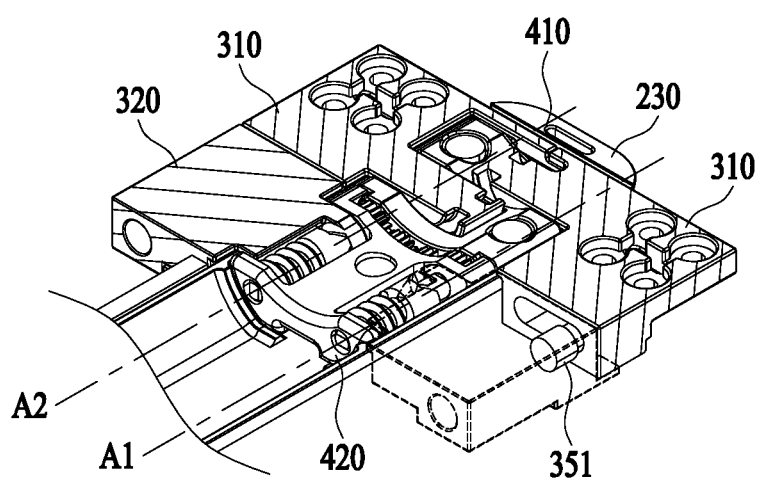
FIGS. 6E and 6F are schematic perspective views illustrating a rotating operation of a hinge module according to an embodiment of the present disclosure.
Figure 6F:
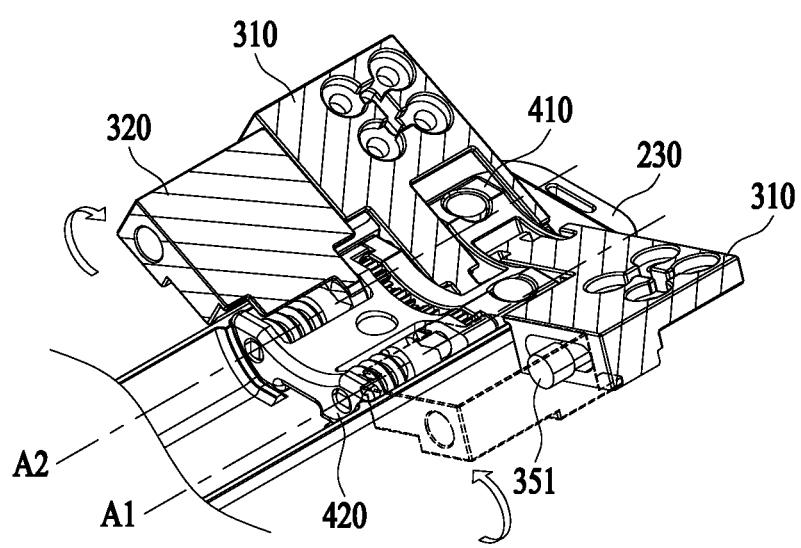

In particular, FIG. 6A is a schematic diagram illustrating a position of a connection part of a hinge module of another electronic device according to an embodiment of the present disclosure, FIG. 6B is a schematic exploded view of a hinge module according to an embodiment of the present disclosure, and FIGS. 6C and 6D are side views of a slot body according to various embodiments of the present disclosure. In particular, FIGS. 6C and 6D are side views of the slot body of FIG. 6B as viewed from a direction A. In addition, FIGS. 6E and 6F are schematic perspective views illustrating a rotating operation of a hinge module according to an embodiment of the present disclosure.

According to various embodiments, the connection part 350 may include a connection pin 351, a spring 353, and a slot bracket 355. In addition, the slot body 310 includes a slot 312 formed in one side thereof facing a gear body 320, the slot 312 into which the connection pin 351 can be inserted. The gear body 320 may also include a first hole 322 corresponding to the connection part 350. For example, a substantial portion of the connection part 350 can be inserted into the first hole 322 of the gear body 320, and a portion of the connection pin 351 can be inserted into the slot 312 of the slot body 310.

In addition, the slot 312 of the slot body 310 may include a first slot region 314, a second slot region 315, and a third slot region 316, as shown in FIGS. 6C and 6D. The first slot region 314, the second slot region 315, and the third slot region 316 can also constitute a continuous space and be distinguished based on a difference in depth of the slot 312. The first slot region 314 and the third slot region 316 may have depths greater than a depth of the second slot region 315.

In addition, the slot body 310 according to an embodiment may be formed at a height identical to those of the first slot region 314 and the third slot region 316, as shown in FIG. 6C. In other words, the first slot region 314 to the third slot region 316 each can have a substantially straight groove shape. In the slot body 310 according to another embodiment, the second slot region 315 can be formed at a height lower than those of the first slot region 314 and the third slot region 316, as illustrated in FIG. 6D. Accordingly, the first slot region 314 to the third slot region 316 each can have a substantially U-shape.

When one portion of the connection pin 351 is inserted into the first hole 322 of the gear body 320 and the other portion thereof is inserted into the slot 312 of the slot body 310, the connection pin 351 moves along a shape of the slot 312 in response to sliding of the slot body 310 with respect to the gear body 320. The connection pin 351 moves along the shape of the slot 312 and guides relative positions of the slot body 310 and the gear body 320. For example, the slot body 310 can slide with respect to the gear body 320 in response to rotation of the first frame 210 and/or the second frame 220.

Since the electronic device 100 accommodates various components therein, the electronic device 100 has a predetermined thickness. In order to fully fold the electronic device 100 having the predetermined thickness, an inner side of the electronic device 100 may need to have a larger amount of rotation than that of an outer side of the electronic device 100. In the electronic device 100 according to various embodiments of the present disclosure, in order to overcome such a difference in the amount of rotation, the first frame 210 and the second frame 220 each forming the outer side of the electronic device 100 can rotate about different axes (that is, the first axis A1 and the second axis A2) upon folding of the electronic device 100. When rotating upon the folding of the electronic device 100, the first frame 210 and the second frame 220 can partially slide in directions away from the hinge module 300 (or the respective rotation axes).

Accordingly, when the electronic device 100 is folded, the slot body 310 connected to the first frame 210 or the second frame 220 slides in a direction away from the gear body 320 that is directly connected to the rotation axis of the hinge module 300. When the electronic device 100 is gradually folded (e.g., FIG. 6F) from an unfolded state (e.g., FIG. 6E), the slot body 310 can rotate and, at the same time, slide with respect to the gear body 320 in a direction away from the rotation axis of the hinge module 300.

Further, the connection pin 351 of the connection part 350 (e.g., an end portion of the connection pin 351) is inserted into the first hole 322 of the gear body 320 to be fixed thereto. In addition, a pin portion of the connection pin 351 is inserted into the slot 312 of the slot body 310 and moves along the shape of the slot 312. For example, the connection pin 351 is located at the third slot region 316, which is the region closest to the rotation axis among the regions of the slot 312 when the electronic device 100 is fully unfolded. In addition, the connection pin 351 is located at the first slot region 314, which is the region farthest from the rotation axis among the regions of the slot 312 when the electronic device 100 is fully folded. The connection pin 351 also moves along the shape of the slot 312 and guides a linearly moving direction so that the slot body 310 can naturally slide in a designated moving direction as the slot body 310 is connected to the gear body when the first frame 210 and the second frame 220 rotate.

Also, in the electronic device 100 according to various embodiments of the present disclosure, the first slot region 314 and the third slot region 316 may be formed to have depths deeper than a depth of the second slot region 315 between the first slot region 314 and the third slot region 316. Therefore, when the electronic deice 100 is fully folded or unfolded, a user can feel a sense of clicking resulted from insertion of the connection pin 351 into the deepest slot region.

The connection part 350 includes the spring 353 located between the connection pin 351 and the slot bracket 355 inside the first hole 322 of the gear body 320. The spring 353 can be partially compressed by the connection pin 351 and the slot bracket 355 and the connection pin 351 can be pressed by a restoring force of the spring 353 in a direction toward the slot body 310.

Figure 9:
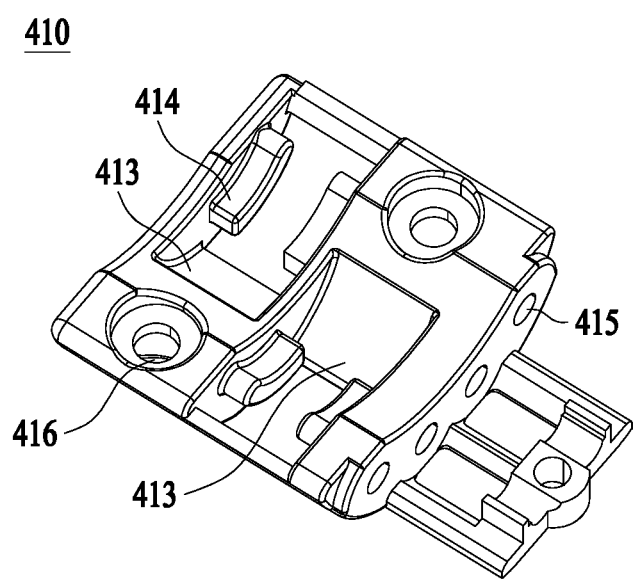
FIG. 9 is a perspective view of a first hinge structure according to an embodiment of the present disclosure.

FIG. 9 is a perspective view of a first hinge structure 410 according to an embodiment of the present disclosure. Hereinafter, a description will be given with reference to the first hinge structure 410 shown in FIG. 9.

Referring to FIGS. 4, 6B to 6F, and 9, the first hinge structure 410 according to various embodiments of the present disclosure includes a first region 413 where a portion of a slot body 310 (e.g., a first portion 318 in FIG. 6B), as shown in FIG. 9. In addition, the first hinge structure 410 includes at least one protrusion 414 formed in a side surface of the region 413 where the portion of the slot body 310 (e.g., the first portion 318). The protrusion 414 corresponds to a shape of a guide groove 317 formed in a side surface of the slot body 310. The guide groove 317 of the slot body 310 is also formed to correspond to a relative position of the protrusion 414 according to movement of the slot body 310. As the slot body 310 moves, the protrusion 414 of the first hinge structure 410 relatively moves along the guide groove 317 of the slot body 310. In other words, the guide groove 317 guides the relative position of the protrusion 414. In this manner, the protrusion 414 and the guide groove 317 can guide a direction of movement (e.g., rotation) of the slot boy 310.

When the electronic device 100 is folded, the first hinge structure 410 can be coupled with the third frame 230 that covers the hinge module 300. For example, the first hinge structure 410 includes a screw hole 416 to be screw-coupled with the third frame 230. A screw 411 (see FIG. 8) can be inserted into the screw hole 416 of the first hinge structure 410 and a screw groove of the third frame 230, thereby fixing the first hinge structure 410 to the third frame 230.

Figure 7:
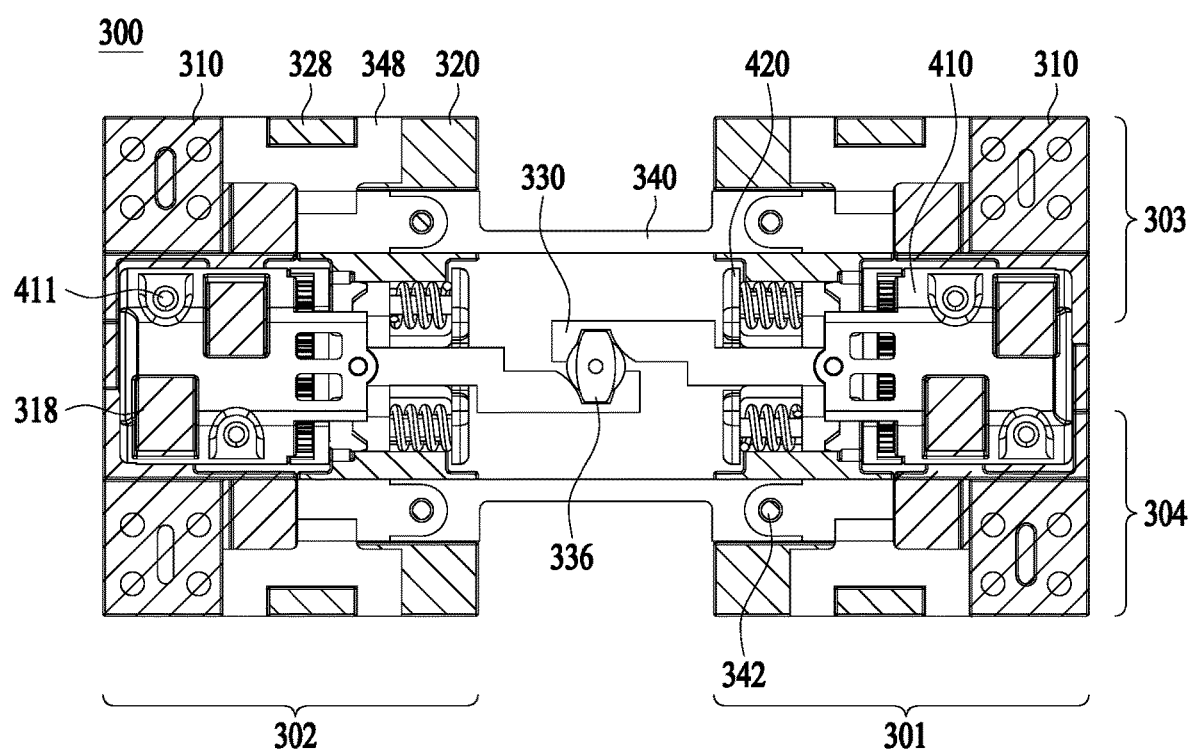
FIG. 7 is a rear view of a hinge module according to an embodiment of the present disclosure.
Figure 8:
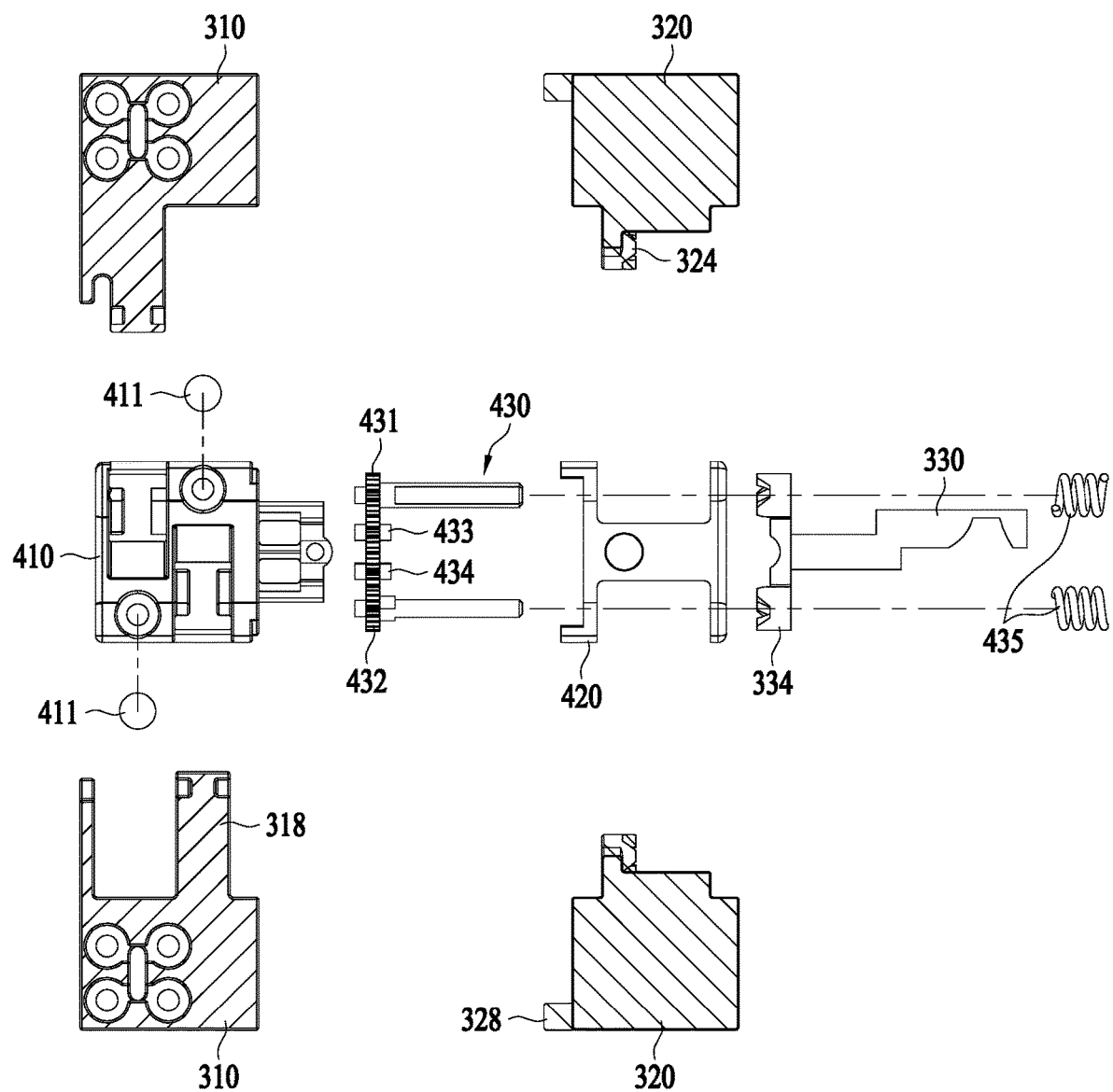
FIG. 8 is a partially exploded cross-sectional view of a hinge module according to an embodiment of the present disclosure.

FIG. 7 is a rear view of a hinge module according to an embodiment of the present disclosure, and FIG. 8 is a partially exploded cross-sectional view of a hinge module according to an embodiment of the present disclosure. Referring to FIGS. 4, 7, and 8, the hinge module 300 of the electronic device 100 according to various embodiments of the present disclosure includes an upper hinge module 303 for controlling operation of the first frame rotatable about the first axis A1 (see FIG. 3), and a lower hinge module 304 for controlling operation of the second frame 220 rotatable about the second axis A2 (see FIG. 3).

Respective operations of the upper hinge module 303 and the lower hinge module 304 can be interlocked and synchronized through a gear set 430 (see FIG. 8). According to one embodiment, the gear set 430 may be located between the first hinge structure 410 and the second hinge structure 420. More specifically, the gear set 430 includes a first main gear 431, a second main gear 432, a first auxiliary gear 433, and a second auxiliary gear 434.

Figure 10:
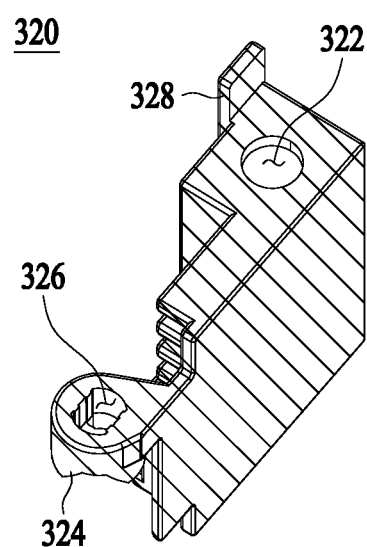
FIG. 10 is a side perspective view of a gear body according to an embodiment of the present disclosure.

The first main gear 431 and the second main gear 432 can be coupled with the gear body 320. In addition, the first main gear 431 can be coupled with the gear body 320 of the upper hinge module 303, and the second main gear 432 may be coupled with the gear body 320 of the lower hinge module 303. The first and second main gears 431 and 432 can be press-fitted to the second hole 326 (see FIG. 10) of the gear body 320 in a spline manner and rotate integrally with the gear bod 320 according to rotation of the gear body 320.

Further, the first auxiliary gear 433 is disposed between the first main gear 431 and the second auxiliary gear 434 to engage with gear teeth of the first main gear 431 and gear teeth the second auxiliary gear 434. In addition, the second auxiliary gear 434 is disposed between the first auxiliary gear 433 and the second main gear 432 to engage with gear teeth of the first auxiliary gear 433 and gear teeth of the second main gear 432.

When the first main gear 431 rotates in response to rotation of the gear body 320 of the upper hinge module 303, the first auxiliary gear 433 engaged with the first main gear 431 can rotate. In addition, the second auxiliary gear 433 engaged with the first auxiliary gear 433 can rotate in conjunction with the rotation of the first auxiliary gear 433. Further, the second main gear 432 engaged with the second auxiliary gear 434 can rotate as well in conjunction with the rotation of the second auxiliary gear 434. Conversely, even when the gear body 320 of the lower hinge module 304 rotate, the first main gear 431 can rotate along with the second auxiliary gear 434 and the first auxiliary gear 433 in conjunction with the rotation of the second main gear 432.

As described above, even when folding or unfolding the electronic device 100 by rotating only the first frame 210, the second frame 220 rotates in conjunction with the first frame 210 due to the gear set 430. Conversely, even when folding or unfolding the electronic device 100 by rotating only the second frame 220, the first frame 210 can rotate in conjunction with the second frame 220 due to the gear set 430.

Figure 11:
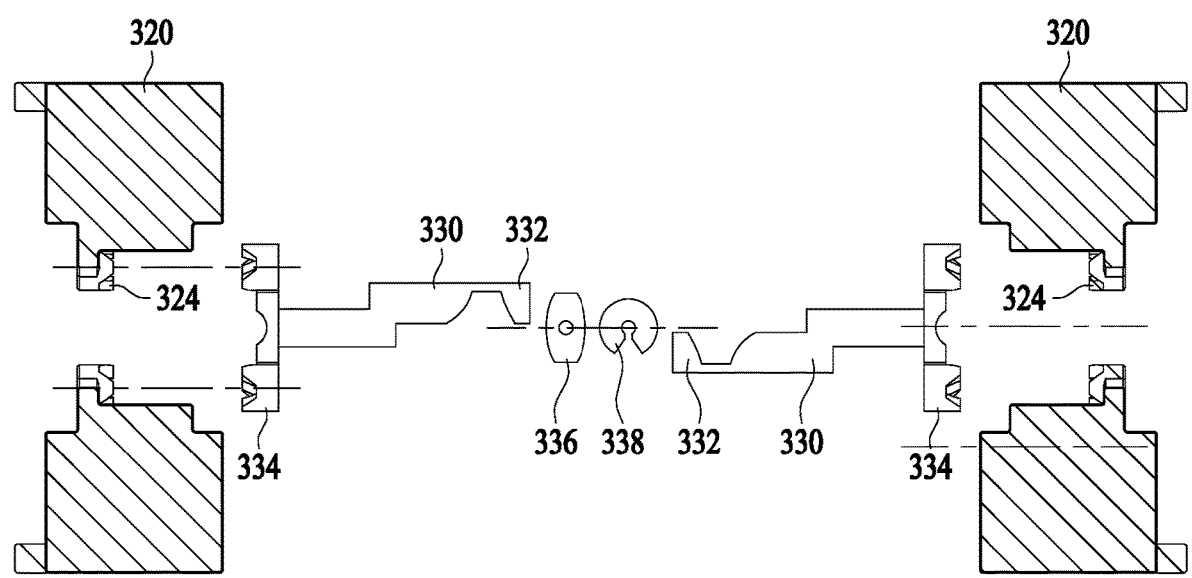
FIG. 11 is a schematic exploded cross-sectional view of a hinge module according to an embodiment of the present disclosure.

Next, FIG. 11 is a schematic exploded cross-sectional view of a hinge module according to an embodiment of the present disclosure. Referring to FIGS. 4, 7, 8, and 11, the hinge module 300 provided in the electronic device 100 according to various embodiments of the present disclosure includes a first hinge module 301 and a second hinge module 302. In addition, in an unfolded state of the electronic device 100, the first hinge module 301 corresponds to a portion disposed on a left side with reference to a front side of the electronic device 100, and the second hinge module 302 corresponds to a portion disposed on a right side with reference to the front side of the electronic device 100. The first hinge module 301 and the second hinge module 302 are also connected to each other through connection arms 330 and a support bracket 340.

According to various embodiments, one end of one connection arm 330 (e.g., gear teeth 334 of the one connection arm 330) is connected to a gear body 320, and the other end of the one connection arm 330 (e.g., a coupling portion 332 of the one connection arm 330) is connected to the other connection arm of a hinge module located on the other side (e.g., a coupling portion 332 of the other connection arm 330). The one connection arm 330 is coupled to the other connection arm 330 through a cam gear 336.

The connection arms 330 and the cam gear 336 connect the first hinge module 301 and the second hinge module 302 to link or (synchronize) rotation of the first hinge module 301 and rotation of the second hinge module 302. In more detail, a connection arm 330 connected to the first hinge module 301 and a connection arm 330 connected to the second hinge module 302 move in directions toward or away from each other as the first frame 210 and/or the second frame 220 is partially rotated.

Further, gear teeth 334 formed at one end of each connection arms 330 correspond to a shape of gear teeth 324 of a corresponding gear body 320. The gear teeth 334 of each connection arm 330 are repeatedly engaged with and disengaged from the gear teeth 324 of the corresponding gear body 320 according to rotation of the first frame 210 and/or the second frame 220 (or rotation of the corresponding gear body 320 resulting therefrom).

When the gear teeth 334 of each connection arm 330 and the gear teeth 324 of the corresponding gear body 320 are engaged with each other, each connection arm 330 moves in a direction away from the other connection arm. Conversely, when the gear teeth 334 of each connection arm 330 and the gear teeth 324 of the corresponding gear body 320 are not engaged with each other, each connection arm 330 moves in a direction toward the other connection arm.

Further, the cam gear 336 is coupled between the connection arm 330 of the first hinge module 301 and the connection arm 330 of the second hinge module 302, thereby enabled to rotate in response to linear movement of the connection arms 330. When the connection arm 330 of the first hinge module 301 moves linearly in a direction away from the cam gear 336, the cam gear 336 rotates to response to the linear movement, and the rotation of the cam gear 336 causes the connection arm 330 of the second hinge module 302 to linearly move in a direction away from the cam gear 336. In addition, each connection arm 330 can linearly move in response to rotation of any one of a plurality of gear bodies 320, and the cam gear 336 can rotate in response to linear movement of each connection arm 330.

As described above, the electronic device 100 according to various embodiments of the present disclosure can use the connection arms 330 and the cam gear 336 to link or synchronize rotation of the first hinge module 301 and rotation of the second hinge module 302. Further, even if a folding or unfolding action takes place at a single side (e.g., a left side or a right side) of the electronic device 100, a rotational force applied to the first hinge module 301 can be applied even to the second hinge module 302.

Also, the hinge module 300 according to an embodiment may further include a snap ring 338 to prevent the cam gear 336, which is to be coupled to the coupling portion of each of the connection arms 330, from deviating from a rotation axial direction of the cam gear 336. The hinge module 300 according to various embodiments of the present disclosure may further include a second hinge structure 420 coupled with the gear set 430.

Gear teeth of each gear of the gear set 430 described above may be located between the first hinge structure 410 and the second hinge structure 420. For example, one ends of gears 431, 432, 433, and 434 can be inserted into gear grooves 415 of the first hinge structure 410 (see FIG. 9), and the other ends of the gears 431, 432, 433, and 434 can be inserted into gear grooves or gear holes of the second hinge structure 420. The other ends of a first main gear 431 and a second main gear 432 can be inserted into and coupled to the gear holes of the second hinge structure 420, and the other ends of a first auxiliary gear 433 and a second auxiliary gear can be inserted into gear grooves of the second hinge structure 420.

In addition, the first main gear 431 and the second main gear 432 passing through the gear hole of the second hinge structure 420 are arranged to pass through the second hole 326 of each gear body 320, a hole portion of each connection arm 330, and a central portion of an elastic member 435 in order named. When the elastic member 435 is supported by a shaft of the first main gear 431 or the second main gear 432 inside the second hinge structure 420, the elastic member 435 can be partially compressed by linear movement of a connection arm 330 and generate a restoring force to the gear teeth 334 of the connection arm 330. When the gear teeth 334 of each connection arm 330 is not engaged with the gear teeth 324 of a corresponding gear body 320, each connection arm 330 can press the elastic member 435 to generate a compressive force. Due to a restoring force resulting from the compression, the gear teeth 324 of the corresponding gear body 320 receives a rotational force so that the gear teeth 334 of each connection arm, 330 becomes engaged with the gear teeth 324 of the corresponding gear body 320.

With the structure of the gear teeth 324 of the corresponding gear body 320 and the gear teeth 334 of each connection arm 330, the electronic device 100 according to various embodiments of the present disclosure can receive, at each predetermined folding angle where the gear teeth 324 and the gear teeth 334 are engaged, a force to maintain a state of a corresponding predetermined folding angle from the elastic member 435. In doing so, the electronic device 100 can implement a pre-stop function to maintain, at a particular angle desired by a user, the folding state of the particular angle.

Figure 12:
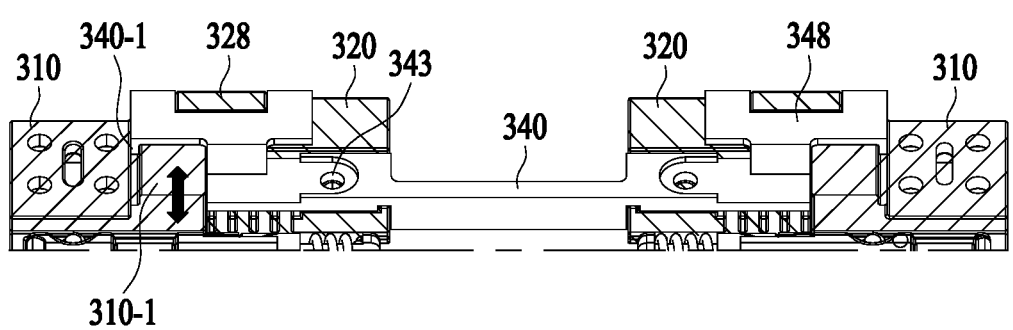
FIG. 12 is a rear partial perspective view illustrating a coupling structure of a support bracket of a hinge module of an electronic device according to an embodiment of the present disclosure.

Next, FIG. 12 is a rear partial perspective view illustrating a coupling structure of a support bracket of a hinge module of an electronic device according to an embodiment of the present disclosure. Referring to FIGS. 7 and 12, the hinge module 300 according to various embodiments includes a support bracket 340 that connects and supports a first hinge module 301 disposed at a first side (e.g., a left side with reference to a front side) and a second hinge module 302 positioned at a second side (e.g., a right side with reference to the front side).

In addition, the support bracket 340 is coupled to a gear body 320 of the first hinge module 301 and a gear body 320 of the second hinge module 302, respectively. For example, the support bracket 340 includes a support portion 348 at both ends thereof, the support portion 328 which surround a protruding shape 328 of each gear body 320 to correspond to the protruding shape 328 of each gear body 320. In doing so, the support bracket 340 can be mechanically coupled to each gear body 320. In addition, the support bracket 340 includes a screw-coupling hole 342 to be screw-coupled with each gear body 320, and the support bracket 340 can be screw-coupled with each bear body 320 using the screw-coupling hole 342.

Also, a shape of a support portion 348 of the support bracket 340 may be formed to correspond to a projected structure 310-1 of each slot body 310, thereby auxiliarly guiding a moving direction and a position of each slot body 310 so that each slot body 310 can relatively move (slidably move) from a designated position with respect to a corresponding gear body 320.

Because the support portion 348 has a stopping structure 340-1 corresponding to the projected structure 310-1 of each slot body 310, it is possible to prevent each slot body 310 and a corresponding gear body 320 from being spaced apart each other. In addition, the structure of the support portion 348 of the support bracket 340 and the protruding shape 328 of the gear body 320 can prevent the slot body 310 from over-rotating toward a rear side of the electronic device 100 when the electronic device 100 is fully unfolded.

Figure 13A:
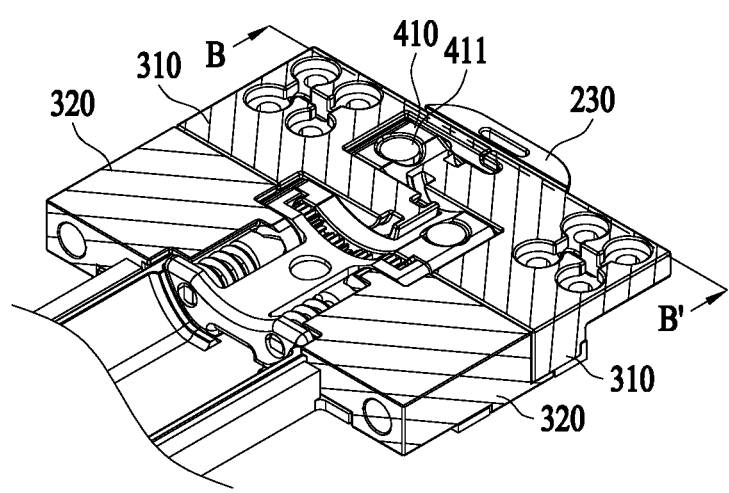
FIGS. 13A to 13C are diagrams illustrating a structure for limiting the rotation angle of the hinge module according to an embodiment of the present disclosure.
Figure 13B:
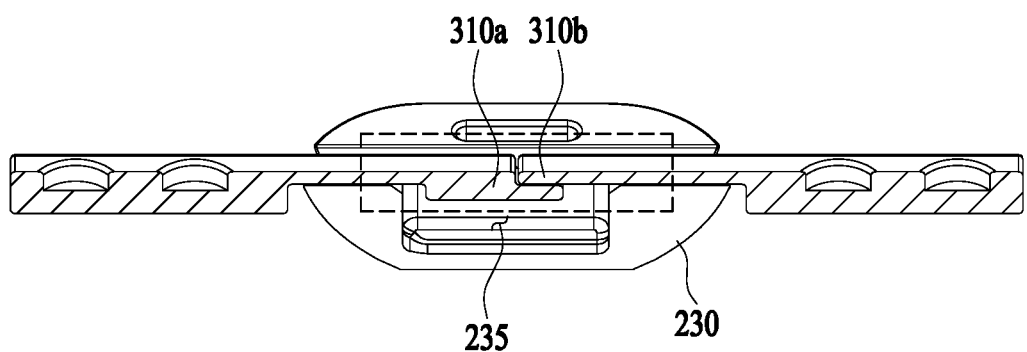
Figure 13C:
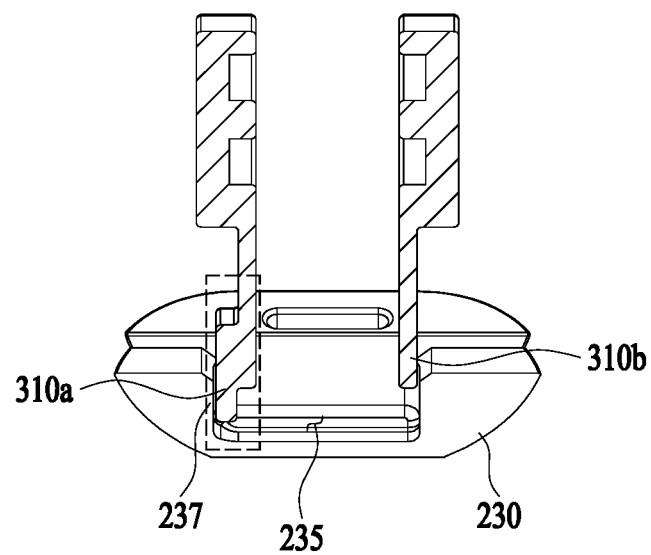

Next, FIGS. 13A to 13C are diagrams illustrating a structure for limiting the rotation angle of the hinge module according to an embodiment of the present disclosure. In particular, FIG. 13A is a partial perspective view of a hinge module according to an embodiment of the present disclosure, and FIGS. 13B and 13C are cutaway perspective views when FIG. 13A is cut in B-B' direction. Further, FIG. 13B corresponds to when an electronic device according to an embodiment is fully unfolded, and FIG. 13C corresponds to when an electronic device according to an embodiment is fully folded.

Referring to FIGS. 3, 4, and 13A to 13C, the hinge module 300 of the electronic device 100 according to various embodiments of the present disclosure includes structures for preventing over-rotation of a slot body 310. In addition, two slot bodies 310 arranged at one side of the electronic device 100, for example, two slot bodies 310 of the first hinge module 310 or two slot bodies 310 of the second hinge module 302, are implemented such that one slot body (e.g., a slot body 310 located at the upper part 303) is fixed to the first frame 210 and the other slot body (e.g., a slot body 310 located at the lower part 304) is fixed to the second frame 220.

As illustrated in FIG. 13B, at one end of the electronic device 100, a slot body 310 located at the upper part 303 of the first hinge module 301 has a first extension 310b having a relatively short length. Further, a slot body 310 located at the lower part 304 of the first hinge module 301 has a second extension 310a having a relatively long length at one end of the electronic device 100. The second extension 310a has a shape in which the second extension 310a surrounds an end portion of the first extension 310b in an unfolded state while not intervening rotation of the first extension 310b. For example, over-rotation of the second extension 310a toward the rear side of the electronic device 100 in the unfolded state can be limited by the first extension 310b. Due to such a structure, the over-rotation of the second frame 220 connected to the slot body 310 of the lower part 304 of the first hinge module 301 can be prevented.

In addition, a slot body 310 located at the lower part 304 of the second hinge module 302 includes the first extension 310b having a relatively short length at the other end of the electronic apparatus 100, and a slot body 310 located at the upper part 303 of the second hinge module 302 includes the second extension 310a having a relatively long length. Similarly, over-rotation of the second extension 310a toward the rear side of the electronic apparatus 100 in the unfolded state can be limited by the shape of the first extension 310b. Due to this structure, the over-rotation of the first frame 210 connected to the upper part 303 of the second hinge module 302 can be prevented.

As illustrated in FIG. 13C, the third frame 230 includes a space 235 in which the first extension part 310b and the second extension part 310a are rotatable, and a limiting structure 237 which limits a rotation angle of the first extension 310b and the second extension 310a. Due to the limiting structure 237, it is possible to prevent over-rotation of each slot body 310 when the electronic device 100 is folded at a particular angle. In addition, it is also possible to prevent a collision between the first region 151a of the display 151, which is supported by the first frame 210, and the second region 151b of the display 151, which is supported by the second frame 220.

The electronic device 100 according to various embodiments can limit a maximum rotation angle of each slot body 310, the first frame 210, and the second frame 220 to a preset angle by modifying the shape of the limiting structure 237 and/or the shapes of the first and second extensions 310b and 310a. Further, an electronic device according to various embodiments of the present disclosure can selectively enlarge or reduce an image output area of a front side (or a rear side) by employing a flexible display. Accordingly, an electronic device that can be easily carried and selectively utilizes a large display area is provided.

In addition, when the shape of the flexible display is changed, frames supporting respective regions of the display are caused to rotate and at the same time move linearly, thereby preventing the display from being wrinkled or distorted. Further, an electronic device according to various embodiments of the present disclosure provides a hinge configuration that implements a folding or unfolding function smoothly without distortion or deformation of the electronic device even if an uneven rotational force occurs in a specific part of the electronic device or a rotational force occurs only in one region of the electronic device. Further, an electronic device according to various embodiments of the present disclosure provides a pre-hinge function to maintain a folding state of a particular angle and provide a user with a sense of clicking to tactilely guide a folded or unfolded state, thereby improving usability.

Although the exemplary embodiments of the present disclosure have been described in detail with reference to the accompanying drawings, the present disclosure is not limited thereto and may be embodied in many different forms without departing from the technical concept of the present disclosure. Accordingly, the embodiments disclosed herein are intended to not limit but describe the technical aspects of the present disclosure and the scope of the present disclosure is not restricted by the embodiments. The protective scope of the present disclosure should be construed based on the following claims, and all the technical concepts in the equivalent scope thereof should be construed as falling within the scope of the present disclosure.

What is claimed is:

1. An electronic device, comprising:
    a flexible display having a first region and a second region;
    a first frame supporting the first region and rotatable about a first axis;
    a second frame supporting the second region and rotatable about a second axis different than the first axis; and
    a hinge module connecting the first frame and the second frame so that the first frame rotatable about the first axis and the second frame rotatable about the second axis rotate in conjunction and synchronization with each other when the electronic device is folded and unfolded,
    wherein the hinge module further comprises:
    a first hinge module disposed on one side of the electronic device;
    a second hinge module spaced apart from the first hinge module in an axial direction; and
    a synchronization module configured to link the first hinge module and the second hinge module.

2. The electronic device of claim 1, wherein the hinge module further comprises:
    a slot body fixed to either the first frame or the second frame, and
    a gear body connected to the slot body and integrally rotatable with the slot body and guiding a linearly moving direction of the slot body.

3. The electronic device of claim 1, wherein the synchronization module comprises:
    a first connection arm connected to a first gear body of the first hinge module;
    a second connection arm connected to a second gear body of the second hinge module; and
    a cam gear coupled between the first connection arm and the second connection arm.

4. The electronic device of claim 3, wherein the first connection arm and the second connection arm linearly move in directions toward or away from the cam gear in response to a rotation of at least one of the first hinge module or the second hinge module, and
    wherein the cam gear rotates in response to linear movement of at least one of the first connection arm and the second connection arm.

5. The electronic device of claim 1, wherein the hinge module further comprises:
    a first main gear rotating about the first axis in response to rotation of the first frame;
    a second main gear rotating about the second axis in response to rotation of the second frame; and
    auxiliary gears arranged between the first main gear and the second main gear and rotating in engagement with the first main gear and the second main gear.

6. The electronic device of claim 3, wherein the first connection arm and the second connection arm comprise gear teeth at one ends thereof connected to the first and second gear bodies, and
    wherein, in response to rotation of at least one of the first and second gear bodies connected to the first connection arm or the second connection arm, the first connection arm and the second connection arm move linearly in directions toward or away from the cam gear.

7. The electronic device of claim 6, wherein the first and second gear bodies respectively connected to the first connection arm and the second connection arm have gear teeth corresponding to gear teeth of the first connection arm and gear teeth of the second connection arm, and
    wherein the gear teeth of the first and second gear bodies engage with the gear teeth of the first connection arm and the gear teeth of the second connection arm at a preset angle in response to rotation of at least one of the first frame or the second frame.

8. The electronic device of claim 1, wherein the hinge module further comprises a support bracket connecting a first gear body of the first hinge module and a second gear body of the second hinge module.

9. The electronic device of claim 2, wherein the hinge module further comprises a connection pin connecting the slot body and the gear body, and
    wherein the connection pin is fixed to one side of the gear body and guides a linearly moving direction of the slot body in accordance with a shape of a slot provided in the slot body.

10. The electronic device of claim 9, wherein both ends of the slot of the slot body have a depth deeper than a depth of a central portion thereof.

11. The electronic device of claim 2, wherein when rotating, the slot body slides with respect to the gear body in a direction toward or away from the gear body.

12. The electronic device of claim 2, wherein the hinge module further comprises a first hinge structure for guiding a direction of rotation of the slot body.

13. The electronic device of claim 5, wherein the first main gear rotates about the first axis in response to the rotation of the first frame or the rotation of the second frame, and
    wherein the second main gear rotates around the second axis in response to the rotation of the first frame or the rotation of the second frame.

14. The electronic device of claim 1, wherein when rotating, the first frame linearly moves in a direction toward or away from the second frame.

15. A folding device, comprising:
    a first frame disposed to be rotatable about a first axis;
    a second frame disposed to be rotatable about a second axis spaced apart and substantially parallel with the first axis the first axis; and
    a hinge module connecting the first frame and the second frame so that the first frame rotatable about the first axis and the second frame rotatable about the second axis rotate in conjunction and synchronization with each other when the folding device is folded and unfolded,
    wherein the hinge module further comprises:
    a first main gear rotating about the first axis in response to rotation of the first frame;
    a second main gear rotating about the second axis in response to rotation of the second frame; and auxiliary gears arranged between the first main gear and the second main gear and rotating in engagement with the first main gear and the second main gear.

16. The folding device of claim 15, wherein the hinge module further comprises:
- a first hinge module disposed on one side of the folding device; and
- a second hinge module spaced apart from the first hinge module, and
- wherein the first hinge module and the second hinge module are connected to each other through a connection arm.

17. The folding device of claim 16, wherein, in response to rotation of one of the first hinge module and the second hinge module, the connection arm causes the other one of the first hinge module and the second hinge module to rotate.

18. The folding device of claim 16, wherein each of the first hinge module and the second hinge module comprises:
- an upper slot body fixed to the first frame and an upper gear body connected to the upper slot body; and
- a lower slot body fixed to the second frame and a lower gear body connected to the lower slot body, and
- wherein the connection arm is connected to each of the upper gear body and the lower gear body.

19. The folding device of claim 15, wherein the gear structure comprises a gear set configured to, in response to rotation of one of the first frame and the second frame, cause the other one of the first frame and the second frame to rotate.

* * * * *